(12) United States Patent
Talty et al.

(10) Patent No.: US 8,706,350 B2
(45) Date of Patent: Apr. 22, 2014

(54) SECONDARY SENSING FOR INTELLIGENT PASSIVE ENTRY PASSIVE START POLLING

(75) Inventors: Timothy J. Talty, Beverly Hills, MI (US); David T. Proefke, Troy, MI (US); Craig Atiyeh, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/314,028

(22) Filed: Dec. 7, 2011

(65) Prior Publication Data

US 2012/0158244 A1 Jun. 21, 2012

Related U.S. Application Data

(60) Provisional application No. 61/424,501, filed on Dec. 17, 2010.

(51) Int. Cl.
*G06F 7/00* (2006.01)

(52) U.S. Cl.
USPC .......................................................... 701/36

(58) Field of Classification Search
USPC ................................... 701/36; 340/5.61, 561
See application file for complete search history.

(56) References Cited

U.S. PATENT DOCUMENTS

| 5,929,769 | A | * | 7/1999 | Garnault | 340/5.61 |
| 5,973,611 | A | | 10/1999 | Kulha | |
| 6,366,204 | B1 | * | 4/2002 | Zannier | 340/561 |
| 7,140,755 | B2 | * | 11/2006 | Pastrick et al. | 362/494 |
| 7,777,614 | B2 | | 8/2010 | Hayashi | |
| 2008/0296926 | A1 | * | 12/2008 | Hanzel et al. | 296/146.1 |

FOREIGN PATENT DOCUMENTS

DE  10340792  *  4/2005

* cited by examiner

*Primary Examiner* — Mary Cheung
*Assistant Examiner* — Anne Mazzara
(74) *Attorney, Agent, or Firm* — John A. Miller; Miller IP Group, PLC

(57) ABSTRACT

A system and method for providing a polling signal transmitted from a vehicle that is received by a key fob held by an authorized user of the vehicle as the user approaches the vehicle. When the key fob receives the polling signal, it will automatically transmit a command signal back to the vehicle for some vehicle operation to be performed. Battery power is conserved on the vehicle by using an infrared detector to first detect whether a living thing is in proximity to the vehicle prior to the vehicle transmitting the polling signal.

18 Claims, 4 Drawing Sheets

SECONDARY SENSING FOR INTELLIGENT PASSIVE ENTRY PASSIVE START POLLING

CROSS-REFERENCE TO RELATED APPLICATIONS

This application claims the benefit of the priority date of U.S. Provisional Patent Application Ser. No. 61/424,501, titled Secondary Sensing for Intelligent Passive Entry Passive Start Polling, filed Dec. 17, 2010.

BACKGROUND OF THE INVENTION

1. Field of the Invention

This invention relates generally to a system and method for polling a vehicle key fob to determine when an authorized vehicle user is approaching a vehicle and, more particularly, to a system and method for polling a vehicle key fob to determine when an authorized vehicle user is approaching a vehicle that includes using an infrared detector on the vehicle to identify a living thing in the vicinity of the vehicle and then using a low frequency (LF) pulsed signal to poll the key fob if a living thing is identified so as to conserve battery power on the vehicle.

2. Discussion of the Related Art

Modern vehicles typically include a key fob that wirelessly transmits RF command signals to a vehicle controller to perform certain vehicle functions, such as lock the doors, unlock the doors, open the trunk, open the hatch, start the engine, turn on a security light, etc. The vehicle operator will press a particular push button on the key fob that typically has an image of the function that the button provides in order to transmit the command signal to the vehicle. The transmission is coded in such a manner that not only does the command perform a certain operation, but also protects the transmission from being recorded and resent by a third party. Key fobs of this type typically have a limited range, and provide a convenience factor for the vehicle operator.

Modern vehicles also typically allow a vehicle driver to set various vehicle devices and systems, such as vehicle mirrors, seats, pedals, radio, etc., to a particular desirable setting, and then allow the driver to record those settings as pre-sets by activating a storing button. If the settings are changed from the last time the vehicle driver drove the vehicle, such as by another vehicle driver, then that vehicle driver can activate the pre-sets, such as by pressing the storing button or another button, so that all of the devices are returned to the desirable position for that driver. A signal transmitted from the key fob identifying the vehicle driver can be used to set the various vehicle devices and system to the pre-set conditions, where the particular key fob is unique to the vehicle driver.

Systems have been proposed for a vehicle that cause a vehicle door handle to retract into the vehicle door for security purposes and upon detection of an authorized user will extend the handle to allow the driver to gain access to the vehicle. Current systems that deploy a vehicle handle from a retracted position may require about ten feet between when an authorized vehicle user is detected and when the user arrives at the vehicle to perform the operation satisfactorily.

As mentioned above, a typical system that allows a key fob to provide vehicle commands is activated by the vehicle driver or other authorized user using the key fob. It is desirable in some vehicle designs to cause the vehicle to perform the particular function automatically as the user approaches the vehicle, where the user is not required to actively transmit the signal. One known system, referred to as a passive entry passive start (PEPS) system, periodically interrogates or polls the area immediately around the vehicle to detect the key fob using a low frequency (LF) pulsed signal (30-300 kHz) transmitted from the vehicle at a predetermined pulse rate. The pulse width and the pulse rate of the polling signal is set based on how fast the user could be approaching the vehicle and how far from the vehicle it is desirable to first detect the user. When the key fob receives the low frequency pulsed polling signal, and authenticates it, the key fob will automatically transmit a command signal to the vehicle so that the vehicle will perform the particular function that is has been programmed to perform.

Low frequency signals are typically used for the key fob polling because they only radiate a short distance. Further, because of the short range of the low frequency pulsed polling signal, it is possible to interrogate directionally, such as at the left or right side of the vehicle or the front or rear of the vehicle. Thus, because the vehicle can know the direction of the approaching user, the vehicle need only open the door for that side.

Generating and transmitting low frequency signals typically requires a large amount of current, typically on the order of about 700 mA, for each pulse that is transmitted. Therefore, the amount of time that the vehicle is able to provide the pulsed polling signal at the low frequency before the vehicle battery voltage is reduced to an unacceptable state-of-charge, below which the driver may not be able to start the vehicle, is relatively short, for example, on the order of 12-24 hours. When this time has passed since the last time the vehicle was started, the PEPS system will go into a sleep mode, and not be able to provide the polling signal.

SUMMARY OF THE INVENTION

In accordance with the teachings of the present invention, a system and method are disclosed for providing a polling signal transmitted from a vehicle that is received by a key fob held by an authorized user of the vehicle as the user approaches the vehicle. When the key fob receives the polling signal, it will automatically transmit a command signal back to the vehicle for some vehicle operation to be performed. Battery power is conserved on the vehicle by using an infrared detector to first detect whether a living thing is in proximity of the vehicle prior to the vehicle transmitting the polling signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining if a living thing is near a vehicle prior to initiating a polling signal is merely exemplary in nature, and is in no way intended to limit the invention or its applications or uses.

Figure 1:
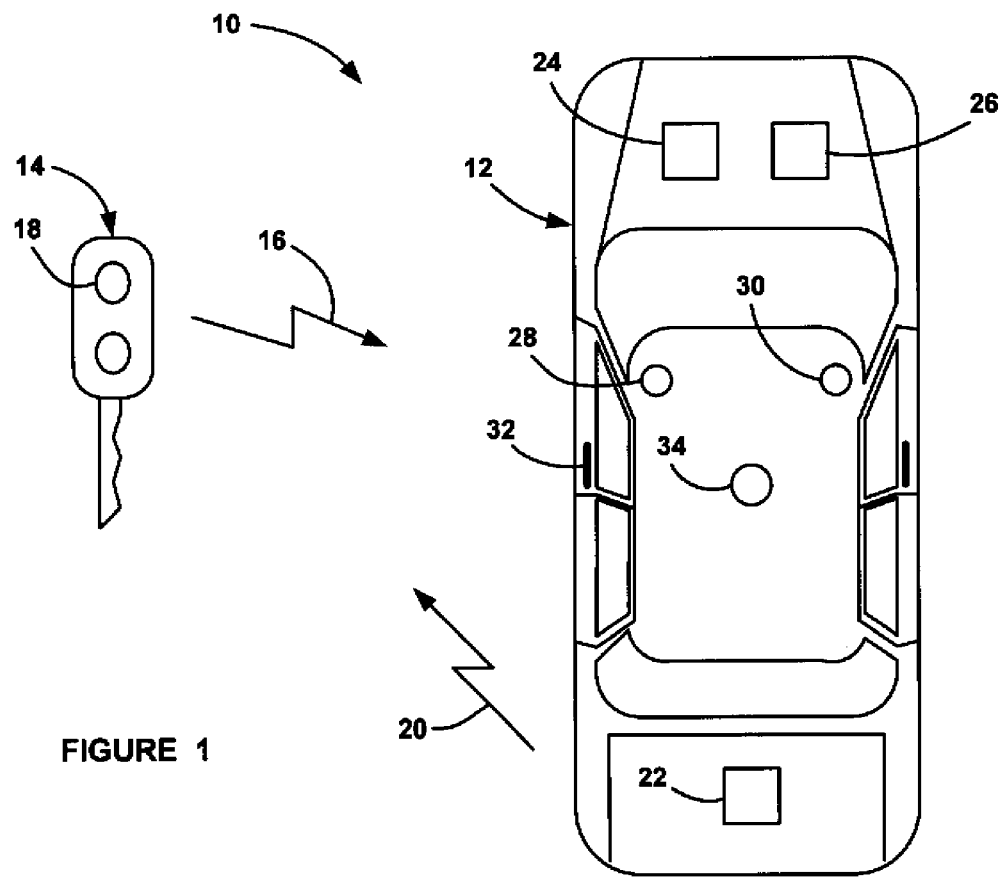
FIG. 1 is an illustration of a vehicle and a key fob in proximity to the vehicle.

FIG. 1 is an illustration of a vehicle system 10 including a vehicle 12 and a key fob 14 in close proximity thereto, which would be carried by a driver or authorized user of the vehicle 12. The key fob 14 includes a plurality of buttons 18 that can be pressed by the vehicle user when the user is within a certain distance of the vehicle 12 to transmit a key fob command signal 16 that causes the vehicle 12 to perform some operation, such as lock the vehicle doors, unlock the vehicle doors, open the vehicle hatch, start the vehicle, etc., in a manner that is well understood by those skilled in the art. In addition to these operations, the vehicle 12 can also include security lights 28 and 30 that can be turned on in response to receiving the command signal 16, and retractable door handles 32 in the doors of the vehicle 12 that can be extended when the vehicle 12 receives the command signal 16.

As discussed above, systems are known in the art that automatically perform these operations where the vehicle 12 may include a PEPS module 22 on the vehicle 12 that generates a LF pulsed polling signal 20 that is received by the key fob 14, and which causes the key fob 14 to automatically transmit the signal 16 to the vehicle 12 to perform one or more of the operations referred to above without actual intervention by the vehicle user. The pulsed polling signal 20 will have a predetermined pulse width and pulse rate that can be determined based on how fast the authorized user may be approaching the vehicle 12 and/or at what distance the user is detected from the vehicle 12, consistent with the discussion herein. The vehicle 12 includes various modules that perform various operations on the vehicle 12 in response to receiving the key fob command signal 16, such as a body control module (BCM) 24 and a vehicle control module 26, all well known to those skilled in the art.

The vehicle system 10 can be designed in any manner suitable for a particular type of vehicle or a particular type of vehicle design where the buttons 18 may or may not be part of the key fob 14 so that all of the vehicle operations can be automatically performed upon receiving the polling signal 20, or some of the desired vehicle functions can be performed automatically and some can be performed by the operation of the buttons 18 on the key fob 14.

According to the invention, the vehicle 12 includes an infrared (IR) detector 34 that detects heat from living things within a certain range of the vehicle 12 that may be warmer than the environment. Heat signature signals emitted by a living object will be received by the detector 34 to indicate that a living thing is present. Suitable examples of such detectors include the commercially available Siemens IR detection system and the STE electronics application infrared detection system. The particular infrared detector being employed can be selected and calibrated for detecting living things within a pre-defined range from the vehicle 12, a particular size of an object that is detected, etc. The IR detector 34 would be positioned at a suitable location on the vehicle 12, possibly on a vehicle antenna (not shown) extending from the vehicle 12. Further, multiple IR detectors can be provided on the vehicle 12 at different locations for providing a wider range of detection.

IR detectors of this type typically draw about 10-25 mA of current over the same pulse period as the LF polling pulses, thus reducing the amount of current that the detector 34 uses compared to the low frequency polling signal. Therefore, because the polling signal 20 is not continuously being transmitted from the vehicle 12, and is only transmitted after the detection of a living thing proximate the vehicle 12 by the infrared detector 34, there is less of a voltage drain on the vehicle battery, and thus the polling procedure can be performed for a longer period of time after the vehicle 12 is shut-down. The heat signature signal received by the detector 34 should be able to tell the vehicle 12 the distance that the living thing is from the vehicle and how fast it is approaching the vehicle 12.

Figure 2:
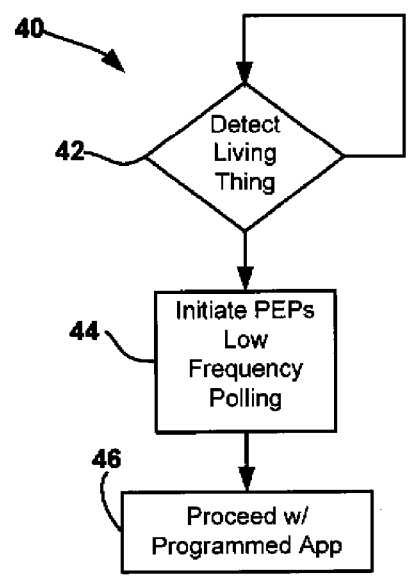
FIG. 2 is flow chart diagram showing an operation for detecting an object near the vehicle, and if so, initiating a PEPS polling signal.

As discussed above, once the detector 34 receives a heat signature signal indicating that a living thing is in close proximity to the vehicle 12, it provides a signal that initiates the PEPS low frequency polling signal 20 to determine if that living thing is someone carrying the authorized key fob 14. This operation is illustrated in FIG. 2 by flow chart diagram 40 where at decision diamond 42 a PEPS algorithm uses the IR detector 34 to detect an approaching living thing, and if one is detected, initiates the PEPS low frequency polling signal 20 at box 44. If the polling process at the box 44 does determine that there is an authorized key fob 14 in the vicinity of the vehicle 12, where the vehicle 12 receives the command signal 16, then the vehicle 12 will proceed with the programmed operations at box 46, as discussed above.

One application for using the infrared detector 34 is that the security lights 28 and 30 can be turned on upon detection of any living thing near the vehicle 12, which could be a deterrent against theft. This operation is separate from the polling process to determine whether the authorized key fob 14 is approaching the vehicle 12, where the security lights 28 and 30 would be activated when the detector 34 detects a living thing and the PEPS module 22 generates the polling signal 20 irregardless of whether a key fob actually detects the polling signal 20 or if the living thing is the authorized vehicle user.

Although the discussion above concerns using infrared detection to detect living things, alternate embodiments may be proposed where the detection process detects any type of motion before the polling signal 20 is initiated, depending on the amount of current needed for that type of detection.

In an alternate embodiment, instead of using the low frequency pulsed polling signal 20 to poll the key fob 14, the polling signal generated by the vehicle 12 to poll the key fob 14 could be in the VHF-UHF (very high frequency-ultra-high frequency) band (30 MHz-3 GHz), which would use much less power than the low frequency band, possibly only 5 mA per pulse, for a polling system limited to the desired range.

Figure 3:
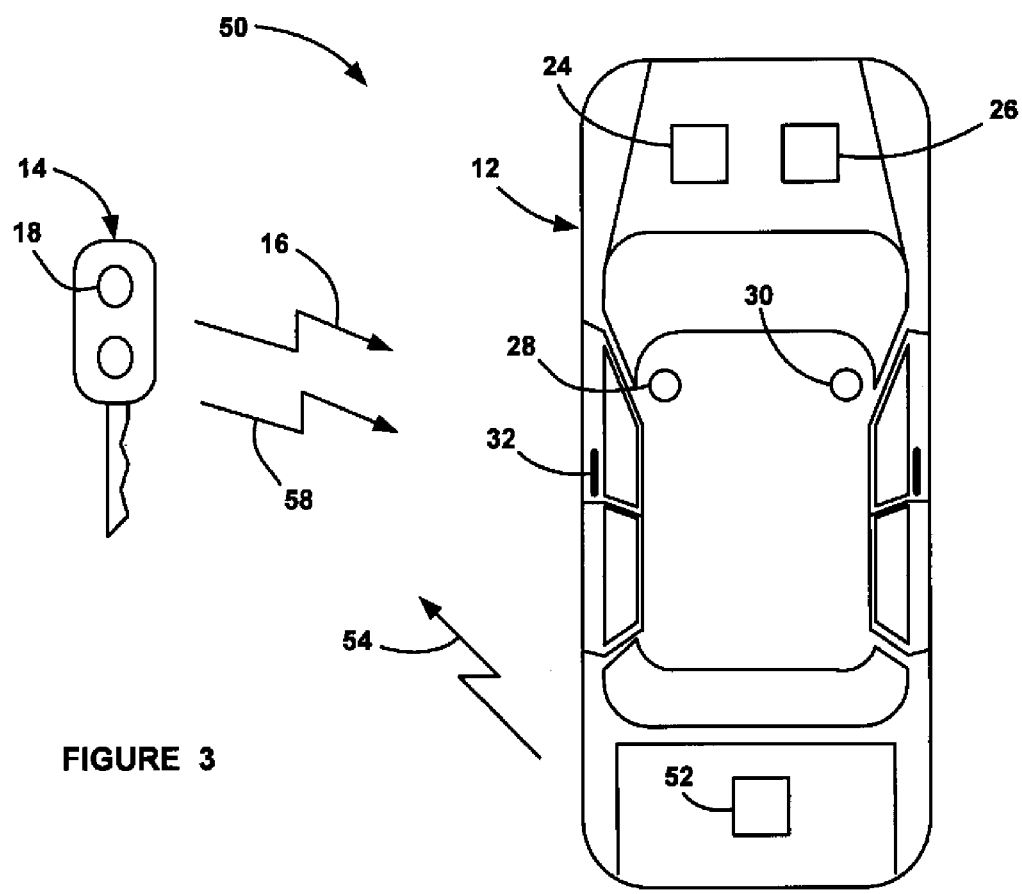
FIG. 3 is an illustration of a vehicle and a key fob in proximity to the vehicle where the vehicle uses the VHF-UHF band to poll the key fob.
Figure 4:
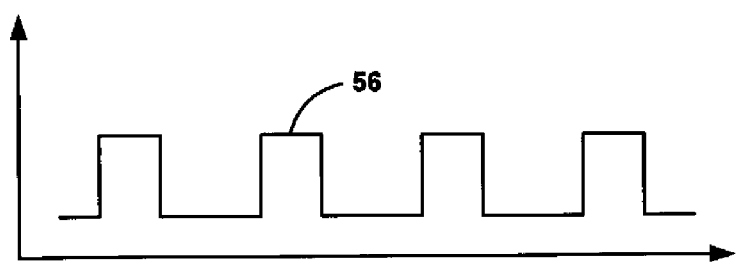
FIG. 4 is a graph with time on the horizontal axis and magnitude on the vertical axis showing a pulsed polling signal for the UHF-VHF signal.

FIG. 3 is an illustration of a vehicle system 50 that operates in this manner, where like elements to the vehicle system 10 are identified by the same reference number. The system 50 does not include the infrared detector 34, but instead includes a PEPS module 52 that operates in the VHF-UHF band to transmit a pulsed polling signal 54 centered at a suitable frequency within this band. FIG. 4 is a graph with time on the horizontal axis and magnitude on the vertical axis showing a pulsed signal 56, representative of the polling signal 54, having a particular pulse width and pulse rate. The polling signal 56 includes pulses at predetermined intervals that determine whether the key fob 14 is in the vicinity of the vehicle 12, and how fast it is approaching the vehicle 12.

As above, when the vehicle 12 transmits the VHF-UHF band pulsed polling signal 54, and it is received and authenticated by the authorized key fob 14, the key fob 14 will send the command signal 16 back to the vehicle 12 to cause the vehicle 12 to perform some operation that has been pre-programmed for the particular vehicle and/or the particular user. The battery on the vehicle 12 will not be drained as quickly as otherwise might occur using a low frequency polling signal because of the higher frequency used to transmit the signals, but will operate basically in the same way as the low frequency pulsed polling signal, with an extended range. Alternately, the VHF-UHF polling signal 54 can be a detection signal that detects the key fob 14 at some greater distance from the vehicle 12, where a return signal from the key fob 14 indicates that it is detected, and then the PEPS module 52 can switch to the low frequency polling signal to cause the key fob 14 to perform the actual operation.

In another embodiment, instead of the vehicle 12 transmitting the pulsed polling signal 54, the key fob 14 itself can transmit a VHF-UHF band pulsed polling signal 58 so that the vehicle battery will not be drained at all as a result key fob polling. The polling signal 58 may be received by the vehicle 12 if the key fob 14 is close enough to the vehicle 12 and, if so, the PEPS module 52 transmits a message back to the key fob 14 that the key fob 14 is in the immediate vicinity of the authorized vehicle. When the key fob 14 receives the verifying message back from the vehicle 12, it will then send the command signal 16 to perform the particular operation or operations, as discussed above.

Figure 5:
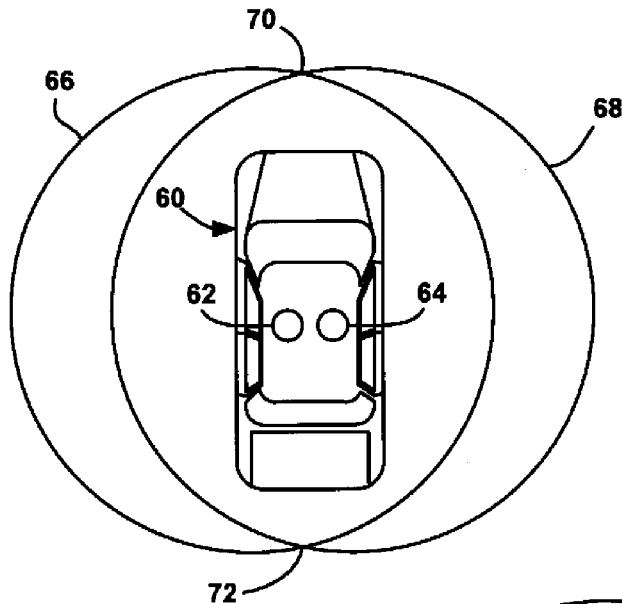
FIG. 5 is an illustration of a vehicle with two polling transceivers.

It is sometimes desirable to know from what direction the key fob 14 is approaching the vehicle 12. One way to do this for this embodiment where the polling uses the UHF-VHF band is to use multiple transceivers employed on the vehicle 12 and time of arrival (ToA) calculations to determine the direction. FIG. 5 is an illustration of a vehicle 60 including two PEPS transceivers 62 and 64 to illustrate this embodiment. Circle 66 shows the radiation pattern for the transceiver 62 and circle 68 shows the radiation pattern for the transceiver 64. By knowing when the transceivers 62 and 64 receive the same signal from the key fob 14 when it is inside the circles 66 and 68, the delta difference in time between when the signal arrives at the transceivers 62 and 64 can be used to determine from what direction the key fob 14 is approaching the vehicle 60 in a manner that is well understood by those skilled in the art.

Figure 6:
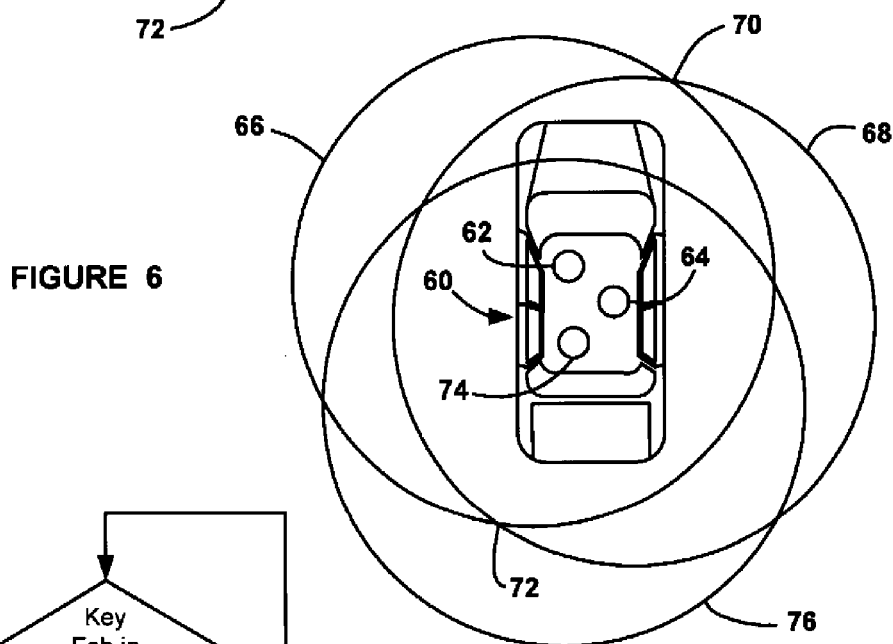
FIG. 6 is an illustration of the vehicle shown in FIG. 6 with three polling transceivers.

Because there are only two transceivers 62 and 64, there will be two locations 70 and 72 where the radiation patterns 66 and 68 cross that the signals would be received at the transceivers 62 and 64 at the same time if the key fob 14 was at one of those locations. In order to overcome this deficiency, three transceivers can be provided. FIG. 6 shows the vehicle 60 with the transceivers 62 and 64 defining the radiation patterns 66 and 68, respectively. A third transceiver 74 is provided on the vehicle 60 and has a radiation pattern 76 that covers the location 72. Therefore, if the key fob 14 is at the location 72, and the vehicle 60 includes the third transceiver 74, the vehicle 60 will know the location of the key fob 14 because of the signal received by the transceiver 74 would arrive sooner that the signal received by transceivers 62 and 64, which would arrive at the transceivers 62 and 64 at the same time. If the key fob 14 is at the location 70, this will be known because it is the only location that the transceivers 62 and 64 will receive the signal at the same time and the transceiver 74 would receive the signal at a later time. Thus, the vehicle 60 can unlock only the door from the side that the user is approaching from.

Figure 7:
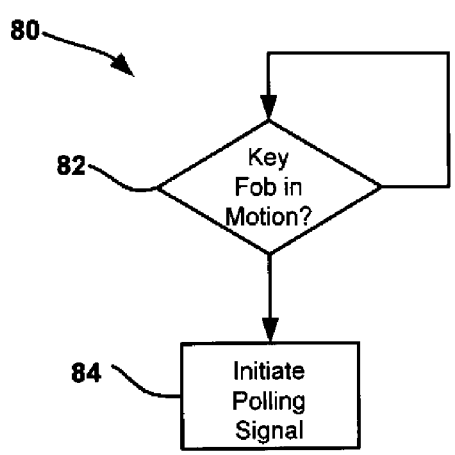
FIG. 7 is a flow chart diagram showing a process for determining whether the key fob is in motion.

The key fob 14 may employ an energy management scheme to limit the amount of current used and conserve key fob battery power if the fob 14 is the polling device. For example, the key fob 14 can employ a motion sensor (not shown), such as an inertial sensor, where the polling signal 58 is only transmitted when the motion sensor indicates that the key fob 14 is moving, i.e., the user is moving. This is represented by flow chart diagram 80 in FIG. 7 where the algorithm determines whether the key fob 14 is in motion at decision diamond 82, and if so, initiates the polling signal 58 at box 84.

Figure 8:
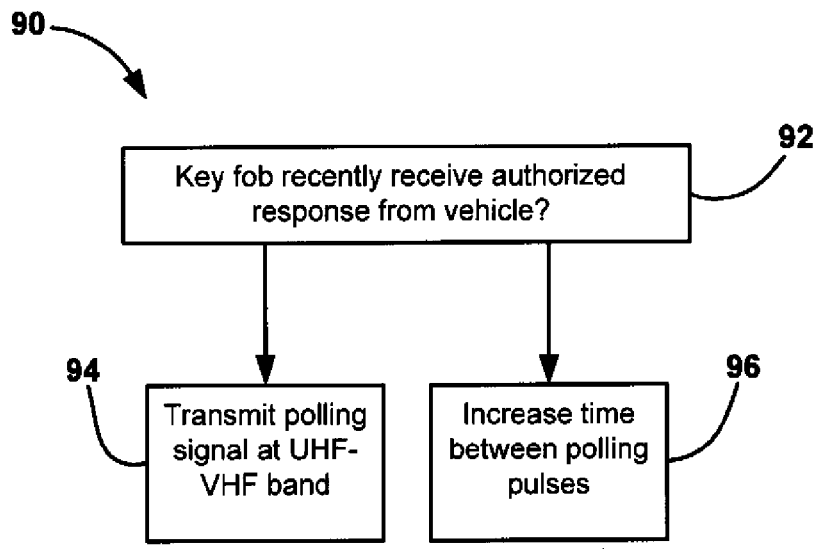
FIG. 8 is a flow chart diagram showing a process for determining whether the key fob recently received an authorized response from the vehicle.

In another energy management scheme, the algorithm used in the key fob 14 determines how often the polling signal 58 will be transmitted based on when the last authorized response from the vehicle 12 was received by the key fob 14. For example, if an authorized user has the key fob 14 on his person, and is not actually approaching the vehicle 12, but is moving around in the vicinity of the vehicle 12, where the vehicle 12 receives the polling signal 58 and transmits back an authorization response, the key fob 14 may increase the time between transmissions of the polling signal 58 so that the pulses are not sent out as often, which conserves battery power. FIG. 8 is a flow chart diagram 90 depicting this embodiment where the algorithm determines whether the key fob 14 recently received an authorized response from the vehicle 12 at box 92, and if not, transmits the polling signal 58 at the UHF-VHF band at box 94. If the key fob 14 has recently received an authorized response from the vehicle 12 in response to the polling signal 58, then the algorithm increases the time between polling pulses at box 96.

Figure 9:
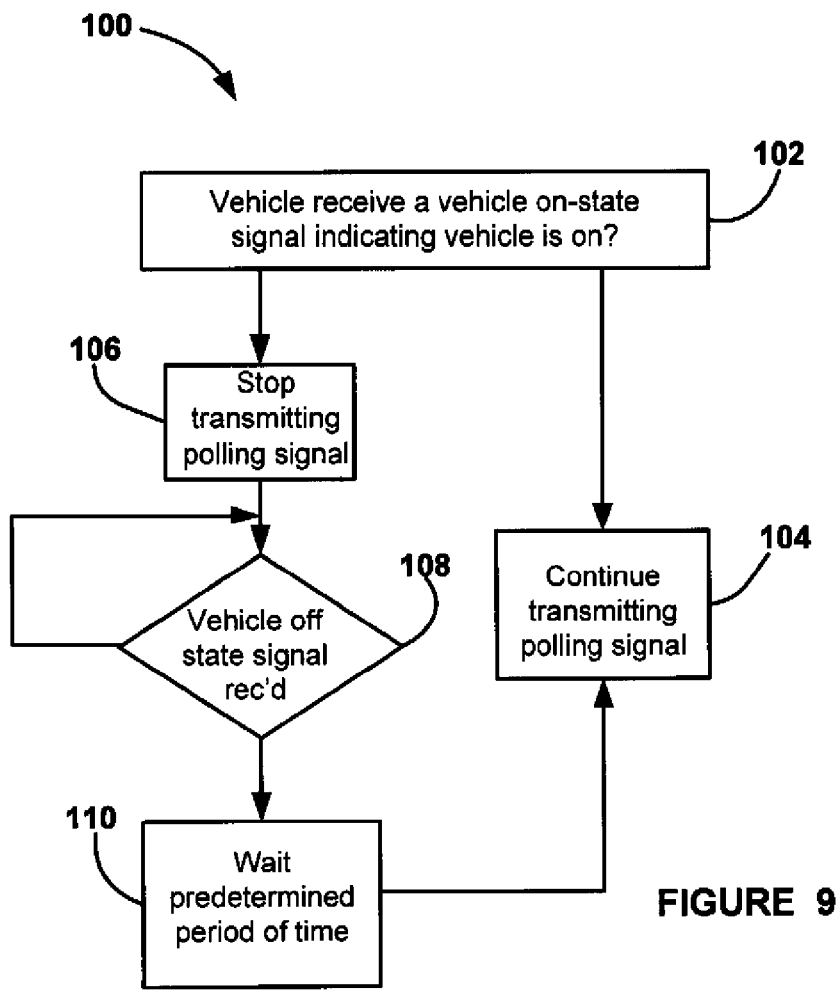
FIG. 9 is a flow chart diagram showing a process for determining whether the vehicle is on or off.

In a third energy management scheme, the key fob 14 will determine when the vehicle 12 is in an on-state (running) or an off-state (not running) using a vehicle state indicator. Particularly, if the key is in the vehicle ignition and the vehicle 12 is running, then it is desirable that the key fob 14 not provide the polling signal 58. FIG. 9 is a flow chart diagram 100 illustrating this energy saving embodiment. At box 102, the algorithm on the key fob 14 determines whether the vehicle 12 has received a vehicle on-state signal indicating that the vehicle 12 is on, and if not, continues transmitting the polling signal 58 at box 104. If the key fob 14 has received the vehicle on-state signal, then the key fob 14 stops transmitting the polling signal 58 at box 106, and then determines whether the vehicle off-state signal indicating that the vehicle 12 is off has been received at decision diamond 108. If the key fob 14 does receive the vehicle off-state signal, it waits a predetermined period of time at box 110, and then resumes transmitting the polling signal 58 at box 104.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for communicating between a vehicle and an authorized user of the vehicle, said method comprising:
providing the authorized user with a communications device;
providing at least one infrared sensor on the vehicle;
detecting living things within a predetermined vicinity of the vehicle based on heat signature signals received by the infrared sensor, wherein the heat signature signals indicate to the vehicle the distance that the living thing is from the vehicle and how fast the living thing is approaching the vehicle;
determining that the user may be within the predetermined vicinity of the vehicle based on heat signature signals received from the living things by the infrared sensor;
transmitting a polling signal from the vehicle that is received by the device if the sensor receives the heat signature signals that may be from the user; and
transmitting a first command signal from the device to the vehicle to cause the vehicle to perform a predetermined vehicle operation if the device receives the polling signal.

2. The method according to claim 1 wherein providing the user with a device includes providing the user with a key fob.

3. The method according to claim 2 wherein the key fob includes control buttons that when operated by the authorized user cause the key fob to transmit a second command signal to the vehicle to perform predetermined vehicle operations.

4. The method according to claim 1 wherein the polling signal is a low frequency pulsed signal.

5. The method according to claim 1 wherein providing at least one infrared sensor includes providing a plurality of infrared sensors on the vehicle.

6. The method according to claim 1 further comprising turning on a vehicle security light in response to detecting a living thing in the predetermined vicinity regardless of whether the living thing is the authorized user.

7. The method according to claim 1 wherein the vehicle operation includes unlocking at least one vehicle door.

8. The method according to claim 1 wherein the vehicle operation includes turning on a vehicle light.

9. The method according to claim 1 wherein the vehicle operation includes extending at least one vehicle door handle on the vehicle.

10. A method for communicating between a vehicle and an authorized user of the vehicle, said method comprising:
providing the authorized user with a key fob communications device;
providing multiple infrared sensors at different locations on the vehicle;
determining that the user may be within a predetermined vicinity of the vehicle based on a heat signature signals received by the infrared sensors;
transmitting a low frequency pulsed polling signal from the vehicle that is received by the key fob communications device if the key fob device is in the vicinity of the vehicle;
transmitting a command signal from the key fob device to the vehicle to cause the vehicle to perform a predetermined vehicle operation when it receives the polling signal; and
turning on a vehicle security light in response to detecting a living thing in the predetermined vicinity regardless of whether the living thing is the authorized user.

11. The method according to claim 10 wherein the vehicle operation includes extending at least one vehicle door handle on the vehicle.

12. A vehicle communications system comprising:
a communications device operable to be carried by an authorized user of the vehicle;
at least one infrared sensor provided on the vehicle and being operable to detect heat signature signals from living things within a predetermined vicinity of the vehicle, said at least one infrared sensor selectively determining that one of the heat signature signals may be from the user, wherein the heat signature signals are used by the vehicle to determine the distance the living thing is from the vehicle and how fast the living thing is approaching the vehicle; and
a polling module provided on the vehicle, said polling module transmitting a polling signal from the vehicle if the infrared sensor receives a heat signature signal from a living thing in the predetermined vicinity of the vehicle that may be the user, said communications device automatically transmitting a command signal from the device to the vehicle to cause the vehicle to perform a predetermined vehicle operation if the device receives the polling signal.

13. The system according to claim 12 wherein the communications device is a key fob.

14. The system according to claim 12 wherein the polling signal is a low frequency pulsed signal.

15. The system according to claim 12 further comprising a security light provided on the vehicle, said vehicle turning on the security light if the infrared sensor receives a heat signature signal from a living thing regardless of whether the living thing is the user.

16. The system according to claim 12 wherein the vehicle operation includes extending at least one vehicle door handle on the vehicle.

17. The system according to claim 12 wherein the vehicle operation includes unlocking at least one vehicle door.

18. The system according to claim 12 wherein the at least one infrared sensor is a plurality of infrared sensors on the vehicle.

* * * * *